(No Model.) 2 Sheets—Sheet 1.
M. MORTON.
UNIVERSAL CUTTER HEAD.
No. 439,673. Patented Nov. 4, 1890.
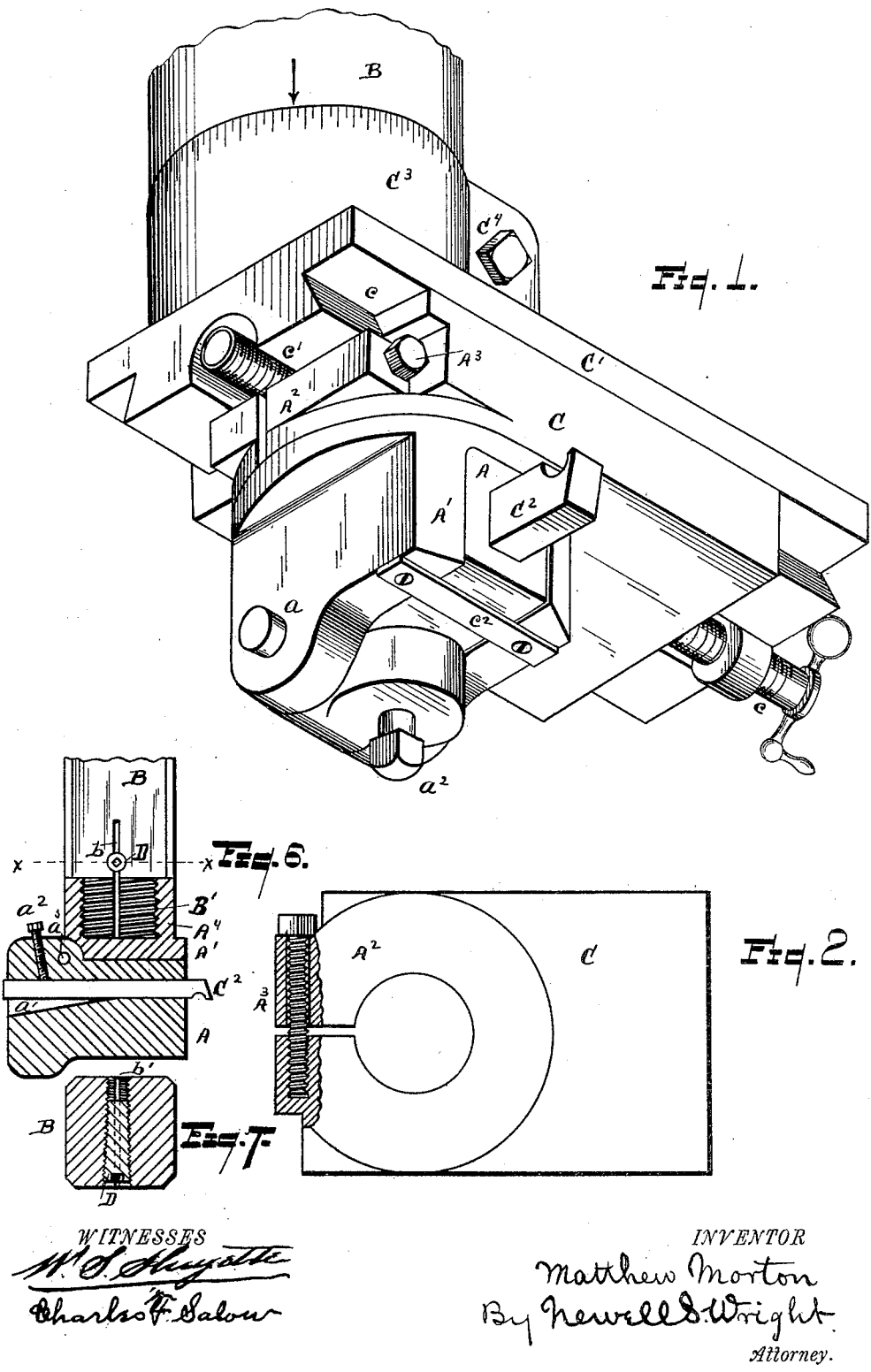
WITNESSES
INVENTOR
Matthew Morton
By Newell S. Wright
Attorney.

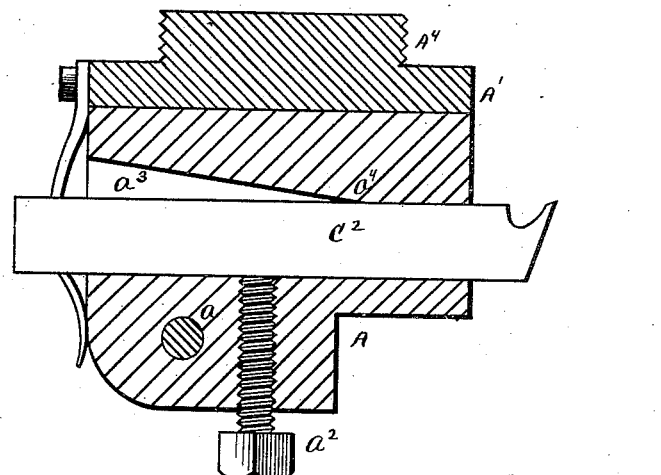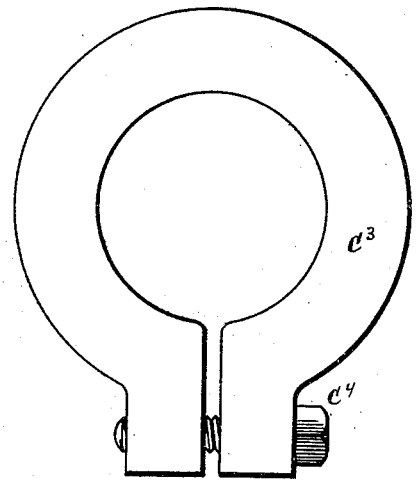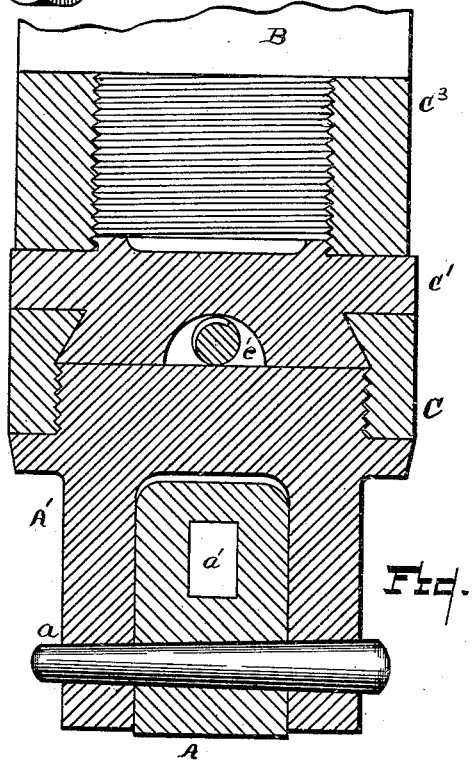

UNITED STATES PATENT OFFICE.

MATTHEW MORTON, OF ROMEO, MICHIGAN.

UNIVERSAL CUTTER-HEAD.

SPECIFICATION forming part of Letters Patent No. 439,673, dated November 4, 1890.

Application filed October 22, 1889. Renewed October 6, 1890. Serial No. 367,279. (No model.)

*To all whom it may concern:*

Be it known that I, MATTHEW MORTON, a citizen of the United States, residing at Romeo, county of Macomb, State of Michigan, have invented a certain new and useful Improvement in Universal Cutter-Heads; and I do declare the following to be a full, clear, and exact description of the invention, such as will enable others skilled in the art to which it appertains to make and use the same, reference being had to the accompanying drawings, which form a part of this specification.

My present invention relates to a new and universal cutter-head for various uses, and has more especial reference to employment upon the cutter-bar of a combined portable planer and key-seat-cutting machine embodied in a separate application, Serial No. 327,778, filed of even date herewith.

To this end my invention consists of the combinations of devices and appliances hereinafter described and claimed, and more fully shown in the accompanying drawings, in which—

Figure 1 is a view in perspective of the universal cutter-head. Fig. 2 is a plan view of the same with the tool-holder removed, showing parts in section. Fig. 3 is a sectional view of the cutter-head. Fig. 4 is a sectional view of the adjustable tool-holder and the head in which it is pivoted, taken at right angles to that shown in Fig. 3. Fig. 5 is a separate view of a clamping-collar. Fig. 6 illustrates a modification of my invention. Fig. 7 is a horizontal cross-section of the same on the line $x\ x$, Fig. 6.

The object of my invention is to construct a universal cutter-head, and one whereby a machine to which it is applied may be used for planing straight or beveled surfaces in various directions, for a slotting-machine, or for other analogous purposes.

To this end a tool-holder A is suitably pivoted in a head A', as shown at $a$. Said head is provided with a screw-threaded stem or collar $A^4$, whereby it may, if desired, be engaged directly upon the screw-threaded end B' of the cutter-bar B. As so connected upon the cutter-bar, it is evident that the cutter-head may be turned to carry the cutter in any desired direction. To adapt the cutter-head for other work, as for planing beveled surfaces, I mount the head A' upon a movable base C, having an adjustable connection, as by a dovetailed union $c$ with an arm C', a feed-screw $c'$ being provided to adjust the one relatively to the other. The arm C' may be provided with a divided collar $C^3$ to engage the cutter-bar, and with a set-screw $C^4$ to unite the one upon the other in any desired adjustment.

A bar $c^2$ may be provided to limit the movement of the tool-holder in the head.

The tool-holder A is constructed with an orifice $a'$ to receive the cutter $C^2$, which may be held in place by a set-screw $a^2$. The holder is preferably pivoted to the head at one side the center of gravity, so that when the cutter-bar descends the tool will fall back away from the work. The orifice $a'$ is cut away, preferably as shown at $a^3$, the binding-screw $a^2$ forcing the cutter against the point $a^4$ to secure it in position. The base C may be provided, also, with a divided collar $A^2$, its open ends united by a set-screw $A^3$ to unite the head firmly upon the cutter-base. Where the head A' simply is to be united to the cutter-bar, as it may be for certain kinds of work, a divided collar may unite the head to the said bar instead of to a base C.

I have hitherto described my invention as adapted for a planer. It will be seen, however, by reference to Fig. 6 that the cutter-head may also be adapted for use on a slotting-machine by reversing the cutter, in which case the cut-away portion of the orifice $a'$ is also reversed, and the position of the set-screw may be altered, as shown in said figure. In this case, moreover, to provide for the tool falling away from the work when being retracted, I pivot the tool-holder as at $a^5$, or upon the opposite side from what it is shown as adapted for a planer. In this case the head A' may be directly engaged upon the cutter-bar.

Fig. 6 also shows a modification of the manner of engaging the tool-holder upon the cutter-bar. To this end the extremity of the cutter-bar is screw-threaded and a collar $A^4$, attached to head A', is screw-tapped to engage therewith. The end of the cutter-bar is also recessed or cut down, as shown at $b$.

D is a tapering screw having an engagement in a corresponding screw-tapped socket $b'$ for spreading the bifurcated end of the cutter-head and binding it against the collar $A^4$ to hold the latter firmly in place upon the cutter-bar.

What I claim as my invention is—

1. In combination, the head $A'$, a tool-holder having a jointed engagement therewith, and a stop to limit the movement of said tool-holder, substantially as described.

2. In combination, a rotatable head $A'$ and a tool-holder jointedly engaged therewith, substantially as described.

3. In combination, a head $A'$, a tool-holder jointedly engaged therewith, a movable base supporting said head, an arm $C'$, adjustably engaged with said base, and a feed-screw to adjust the said base upon said arm, substantially as described.

4. In combination, the head $A'$, a tool-holder jointedly engaged therewith, a base, and a divided collar engaging said head with said base, substantially as and for the purposes described.

5. In combination, the head $A'$, a tool-holder jointedly engaged therewith, a movable base supporting said head, an arm $C'$, adjustably engaged with said base, and a feed-screw to adjust the base upon the arm, said base and said arm each provided with a clamping-collar, substantially as described.

In testimony whereof I sign this specification in the presence of two witnesses.

MATTHEW MORTON.

Witnesses:
S. A. READE,
R. S. READE.